Oct. 15, 1957  H. W. IHRIG  2,809,438
RADIUS ARM PIVOT SUPPORT
Original Filed Aug. 27, 1954
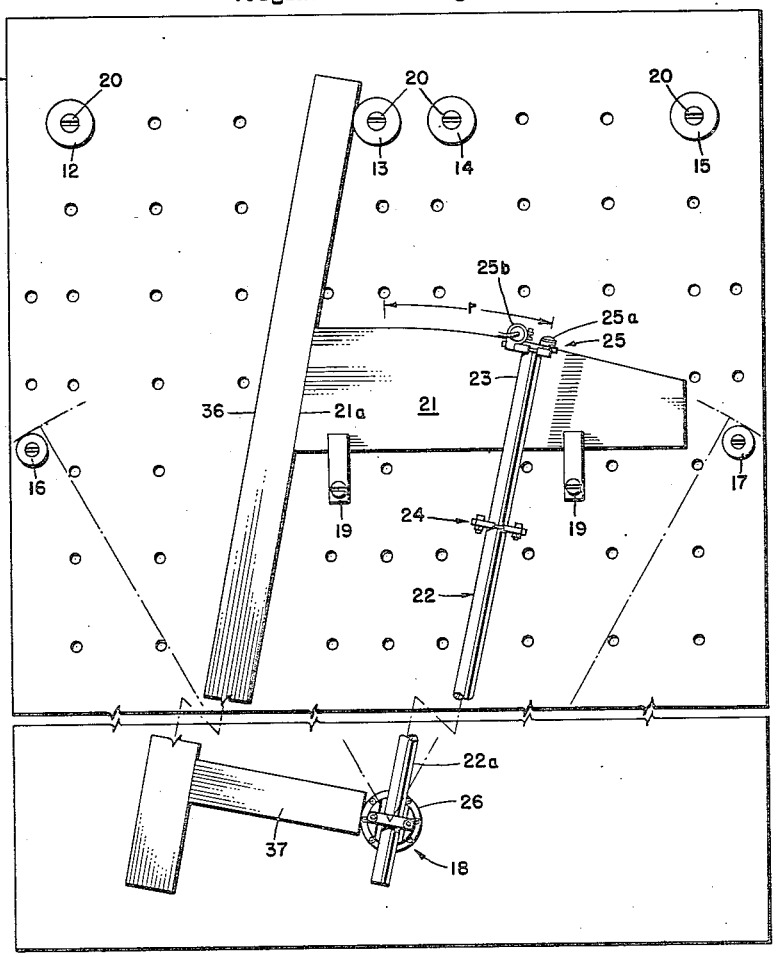
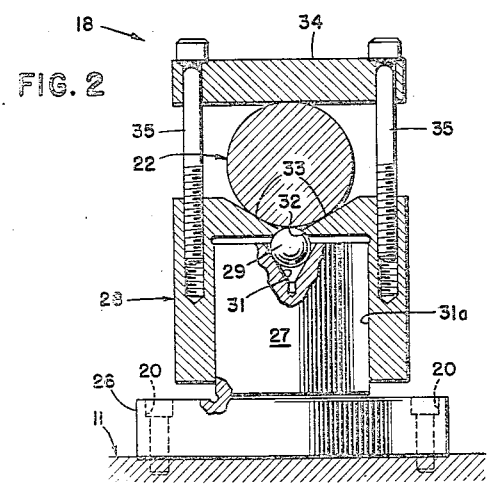
INVENTOR
HARVEY W. IHRIG
BY
ATTORNEYS

United States Patent Office 2,809,438
Patented Oct. 15, 1957

2,809,438

RADIUS ARM PIVOT SUPPORT

Harvey W. Ihrig, Odenton, Md.

Original application August 27, 1954, Serial No. 452,742. Divided and this application June 30, 1955, Serial No. 519,284

2 Claims. (Cl. 33—174)

(Granted under Title 35, U. S. Code (1952), sec. 266)

The invention described herein may be manufactured and used by or for the Government of the United States of America for governmental purposes without the payments of royalties thereon or therefor.

This application is a division of applicant's copending application Serial No. 452,742, filed August 27, 1954, for Checking and Layout Method and Apparatus.

The present invention relates to a radius arm pivot support and more particularly to a radius arm pivot support for use in the accurate measurement of contour and profile gages, and for layout of workpieces for manufacture or tolerance check.

Commonly known methods and apparatus for layout or checking of gages and workpieces are accurate for use only for small workpieces. This limitation is due to inaccuracies introduced both by human error and precision instrument error when long lengths of sine bar are necessary to measure angles of a large workpiece. Another deficiency of the present layout methods and apparatus is that a number of surface plate setups are necessary to locate the angular and radial surfaces of a product in a common plane.

The present invention overcomes the afore-mentioned limitations of known methods and apparatus for layout and checking of gages and workpieces either for accuracy measurement or for manufacture by the presentation of a unique radius arm pivot support to be used in combination with locator discs and a novel sine bar for locating various long length radii and angular surfaces of a product or gage evident in a common plane. By the utilization of a radius center point as a reference point, only one master setup is required in order to measure or machine an article of manufacture to close tolerances.

An object of the present invention is to provide a radius arm pivot support for measuring or checking relatively long radii to within precision tolerance.

Another object is the provision of a pivot support which is constructed of precision parts to enable the assembled device to be a point from which lineal measurements may be taken accurately.

A further object is to provide a pivot support having a precision ball joint between rotatable elements of the device such that rotation about the pivot may be made without undue friction and without disturbing alignment of a supported article on the pivot support.

Other objects and many of the attendant advantages of this invention will be readily appreciated as the same becomes better understood by reference to the following detailed description when considered in connection with the accompanying drawings wherein:

Fig. 1 illustrates a plan view of a preferred embodiment of the invention setup on a surface plate; and Fig. 2 shows a side elevational view partially in section of a radius arm pivot support.

Referring to the drawings, wherein like reference characters designate like or corresponding parts throughout the several views, there is shown in Fig. 1, which illustrates the invention in operational layout, a surface plate 11 having a number of perforations situated therethrough. Locating fixtures such as toolmaker's buttons 12, 13, 14, 15, 16, 17, and radius arm pivot support 18 are secured to the perforations of surface plate 11 by suitable screws 20 to accurately position for machining or measuring a workpiece 21, for example, within an area defined by such fixtures and pivot support 18.

Radius arm 22, having an inner portion 22a and an outer portion 23, is pivotably mounted at inner portion 22a by pivot support 18 which is engaged to surface plate 11 or a remote position thereto to establish long length radii on workpiece 21. Radius arm 22 may be supported at its outer portion 23 by roller support 24 which enables the arm 22 to be arcuately swung on surface plate 11 with pivot support 18 as the center point of the circle of the arc. Connected to the outermost end of arm 22 is a bracket 25 which may hold a measuring gage 25a and a grinder 25b.

Details of the center pivot support 18 are shown best in Fig. 2 wherein a base 26 is connected to surface plate 11 by means of countersunk setscrews 20 circumferentially positioned in the base. A vertical standard 27 is centrally disposed on base 26 to provide a mating surface for the upper surface or closed end 32 of an inverted cup member 28 which is pivotably received thereon. A conical shaped counterbore is coaxially positioned on the upper surface of standard 27 to receive a ball or sphere 29 therein tangent to the wall 31 of the counterbore whereupon a portion of the ball protrudes a predetermined distance above the aforesaid upper surface of the standard and is maintained in a predetermined position by reason of the inclined wall of the conical shaped counterbore in member 27. A mating bore or aperture is provided in the upper surface 32 of the inverted cup to allow the sphere 29 to extend therethrough into a cradle or recess 33 formed in the closed end of the cup 28 thereby to contact the arm 22 and also to tangentially contact the wall defining the cup bore. Cylindrical walls 31a of inverted cup 28 are positioned closely adjacent the wall surface of standard 27. The cradle 33 in upper surface 32 of the inverted cup 28 comprises a pair of oppositely disposed inclined walls arranged in parallel relationship and extending diametrically across the upper surface of the cup and converging toward the aforesaid aperture therein to receive the arm 22 thereon in a manner such that the central vertical axis of standard 27 passes vertically through sphere 29 and arm 22, and the arm 22 is contacted by the walls of cradle 33. A vertically-spaced, horizontal bar 34 is bolted by members 35 to the upper surface 32 of inverted cup 28 to define a space within which arm 22 is clamped.

Radius arm pivot support 18 may be employed as follows, for example, in the checking of a workpiece 21 for accuracy. Sine bar 36 is utilized to check the angularity of an edge 21a of the workpiece by layout of the prescribed angle. Layout is obtained by measuring proper lengths of the opposite and adjacent sides of the angle, space block 37 from pivot support 18 defining one side and either the sine bar 36 or an imaginary line from center support 18 to fixture 13 defining the other side. With the known sides the trigonometric function of the desired angle can be utilized to check or lay out the angle.

Radius "r" of the front edge of workpiece 21 is checked or laid out by swinging the proper radius with arm 22 from center point support 18 and measuring the radius by gage 25a mounted on the end of arm 22 by bracket 25. Reference locator fixtures 16 and 17 may be positioned to periodically check the desired radius to which gage 25a is set. To maintain arm 22 parallel with plate 11, roller support 24 stations arm 22 at the same height above surface plate 11 as does center pivot support 18.

Obviously many modifications and variations of the present invention are possible in the light of the above teachings. It is therefore to be understood that within the scope of the appended claims the invention may be practiced otherwise than as specifically described.

What is claimed is:

1. A radius arm pivot support comprising a base, a vertically disposed cylindrical standard integrally formed with said base at one end thereof, a cylindrical inverted cup having an end wall and a cylindrical wall slidably receivable over said cylindrical standard, a cradle formed in said end wall and having a pair of inclined walls, said cradle extending diametrically across the end wall of said cup for receiving a radius arm, said cradle having a centrally disposed aperture formed therein and defined by said inclined walls, a sphere for rotatably supporting the cup on said standard, the other end of said standard having a centrally disposed bore in communication with said aperture and provided with a conical wall for receiving and maintaining said sphere in a predetermined position within said bore such that the sphere extends through said aperture a distance sufficiently to engage the walls defining the aperture and the radius arm disposed within the cradle whereby said sphere rotatably supports the cup on the standard, and means adjustably carried by said cup for clamping and maintaining the radius arm within said cradle in engagement with said walls defining the cradle and with said sphere.

2. A radius arm pivot support comprising a base, a vertically disposed cylindrical standard integrally formed with said base at one end thereof, a cylindrical inverted cup having an end wall and a cylindrical wall slidably receivable over said cylindrical standard, a pair of oppositely inclined walls symmetrically arranged on opposite sides of a diameter of the end wall of cup and extending across the end wall of the cup, said inclined walls converging toward the diameter and defining a centrally disposed aperture formed along the diameter at the junction thereof for receiving a radius arm, a sphere for rotatably supporting the cup on said standard, the other end of said standard having a centrally disposed bore in communication with said aperture and provided with a conical wall for receiving and maintaining said sphere in a predetermined position within said bore such that the sphere extends through said aperture an amount sufficiently to engage the walls defining the aperture and the radius arm disposed within the inclined wall whereby the sphere rotatably supports the cup on the standard, and adjustable means carried by said cup in engagement with the radius arm for clamping and maintaining the radius arm in engagement with said pair of inclined walls and with said sphere.

References Cited in the file of this patent

UNITED STATES PATENTS

| | | |
|---|---|---|
| 1,153,092 | McDermott | Sept. 7, 1915 |
| 1,796,068 | Van Der Meer | Mar. 10, 1931 |
| 2,369,425 | Becker | Feb. 13, 1945 |
| 2,371,048 | Hayes | Mar. 6, 1945 |
| 2,465,558 | Toth | Mar. 29, 1949 |
| 2,489,733 | Ullman | Nov. 29, 1949 |
| 2,493,786 | Swift | Jan. 10, 1950 |

FOREIGN PATENTS

| | | |
|---|---|---|
| 1,000,934 | France | Feb. 18, 1952 |
| 487,895 | Canada | Nov. 11, 1952 |